Aug. 29, 1967     E. J. SMITH     3,338,419
WASTE TREATMENT APPARATUS
Filed Feb. 1, 1966
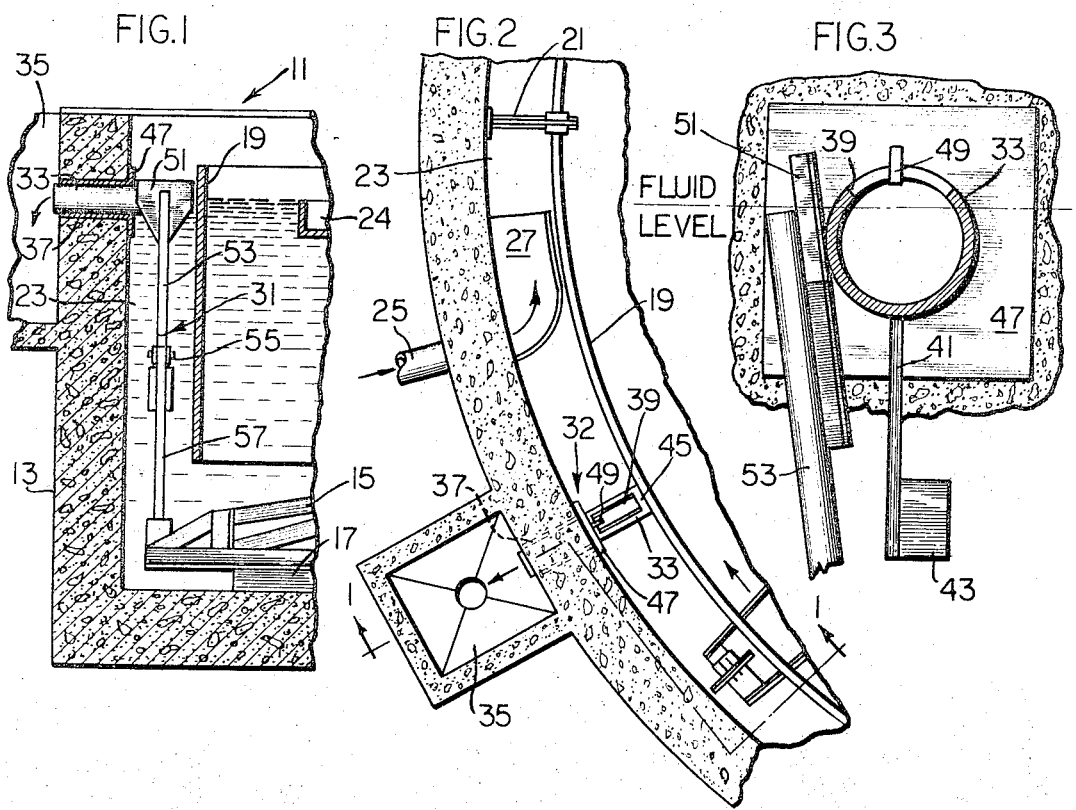
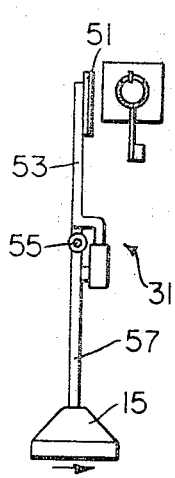
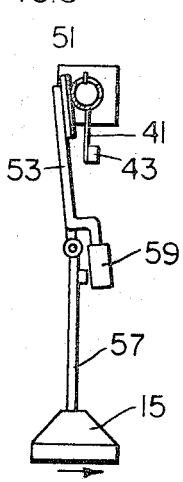
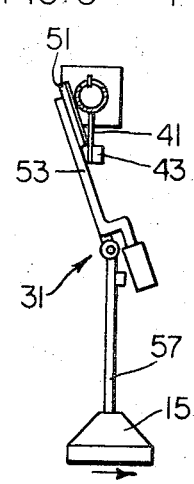
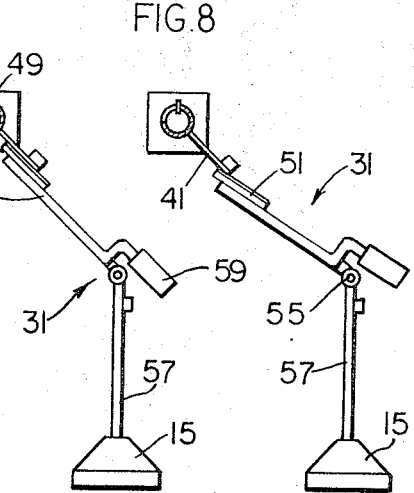
INVENTOR.
EUGENE J. SMITH
BY *Anderson, Luedeka, Fitch, Even, & Tabin*
ATTORNEYS

United States Patent Office 3,338,419
Patented Aug. 29, 1967

3,338,419
WASTE TREATMENT APPARATUS
Eugene J. Smith, Valley Cottage, N.Y., assignor to Yeomans Brothers Company, Melrose, Ill., a corporation of Delaware
Filed Feb. 1, 1966, Ser. No. 524,188
2 Claims. (Cl. 210—525)

This is a continuation-in-part of application Ser. No. 468,025, filed June 29, 1965, and now abandoned.

This invention relates to sewage treatment apparatus and, more specifically, to clarifiers for use in known sewage treatment processes.

In processing sewage, sludge removal from the sewage is often accomplished by passing the sewage through a group of clarifiers or settling tanks. Many of these tanks are generally cylindrical in shape and are provided with means for removing the settled sludge from the tank bottom. In clarifiers of this type, it is known to employ raking arms which carry scraper blades which collect the settled sludge at the bottom of the tank.

Because fluid motion within these tanks has a pronounced effect on the settling activity therewithin, various methods have been employed to carefully control this fluid motion. Clarifiers are known wherein a peripheral raceway is created adjacent the tank wall wherein the inlet flow to the clarifier tank is initially confined. Although various arrangements have been made to effectively remove the sludge by settling, no entirely satisfactory method for handling the floating scum in a clarifier has been developed.

In clarifiers having peripheral raceways, a discharge pipe has often been provided at the upper surface level of the fluid in the raceway which permits a run-off of fluid from the top of the raceway which carries the floating scum with it. This arrangement is not wholly satisfactory because this run-off may account for a significant volume of fluid which must then be further treated before it is acceptable for discharge from the sewage treatment plant. Accordingly, more effective devices for removing floating scum from clarifiers are desired.

It is a principal object of the present invention to provide an improved clarifier incorporating means for effectively handling floating scum. It is another object to provide a clarifier of the peripheral raceway type wherein means are provided in the raceway for the effective removal of floating scum therefrom. It is a further object to provide a clarifier of the type which employs revolving raking arms and a peripheral raceway wherein the raking arms cooperate with associated apparatus for providing efficient removal of floating scum from the surface of the fluid in the raceway without simultaneously discharging large volumes of fluid. These and other objects of the invention are more particularly set forth in the following description and in the accompanying drawings wherein:

FIGURE 1 is a fragmentary sectional view of a clarifier having a peripheral raceway and embodying various features of the present invention;

FIGURE 2 is a fragmentary plan view of the clarifier shown in FIGURE 1;

FIGURE 3 is an enlarged fragmentary sectional view illustrating a portion of the clarifier shown in FIGURE 2 after subsequent movement has occurred; and FIGURES 4 through 8 are a succession of diagrammatic representations illustrating, stepwise, movement of parts of the clarifier shown in FIGURE 1.

A clarifier 11 in which the influent is peripherally fed is shown in FIGURE 1. The clarifier 11 very generally comprises an open-topped circular cylindrical settling tank 13 having a sludge removal assembly including one or more centrally pivoted rotatable raking arms 15. The particular details of the raking arms 15 and the overall sludge removal system of which they are an integral part form no part of the present invention. For the sake of completeness, it is noted that these details are set forth in my copending U.S. application Ser. No. 468,025, filed June 29, 1965. For purposes of the present invention, it is believed sufficient that it be understood that the raking arms 15 carry depending scraper blades 17 and are centrally supported and slowly revolved, sweeping 360° around the bottom surface of the tank 13.

A tubular baffle or skirt 19, of a diameter less than that of the cylindrical tank 13, is supported by brackets 21 interior of the tank where it forms a raceway 23, i.e. the region between the baffle and the interior vertical surface of the cylindrical tank wall. The baffle 19 may be either concentrically or eccentrically positioned within the tank 13. An eccentrically positioned baffle of course forms a raceway wherein the flow of the influent follows a generally spiral path.

The baffle 19 extends upward to a location above the fluid level in the tank 13 and downward to a location spaced above the bottom of the tank a sufficient distance to permit passage thereunder of the outer ends of the raking arms 15. Communication between the raceway 23 and the central region of the tank 13 wherein settling primarily occurs is of course accomplished by fluid flow under the baffle 19. The effluent, from which the settled sludge has been removed, is withdrawn from the clarifier 11 from a location interior of the baffle 19, as by a weir ring 24, and conveyed via suitable conduits (not shown) exterior of the tank 13. It is, of course, the level of the outlet which determines the fluid surface level within the clarifier 11, as is common in apparatus of this type.

An influent pipe 25 for delivering the fluid sewage to be processed passes through the outer wall of the tank 13 near its upper end, entering the raceway 23. In a spiral flow raceway, the influent pipe 25 is generally located at the region of the greatest width. A tangential baffle 27 at the terminus of the pipe 25 directs the incoming sewage at generally right angles into the raceway 23.

In a clarifier of peripheral raceway design, the floating scum is confined to the raceway. To remove floating scum from the surface of the fluid in the raceway 23, a scum skimmer 31 is provided which cooperates with fluid discharge means 32. Discharge means 32 includes a pipe 33 located at approximately the height of the fluid surface level within the tank. The pipe 33 extends through the outer wall of the tank and leads to a scum box 35. The scum removal pipe 33 extends across the raceway 23 and is normally closed. Operating means is provided for opening the discharge means 32 to allow intermittent flow of fluid through the pipe 33. By permitting only intermittent flow, rather than continuous flow, through the pipe 33, the total volume of fluid which is discharged from the tank 13 to assure adequate removal of the floating scum is substantially reduced.

The scum removal pipe 33 is rotatable about its horizontal axis, as by mounting it in a suitable socket 37, e.g. a piece of slightly larger diameter pipe that is set in the concrete wall of the tank 13. The pipe 33 contains a slot 39 of approximately 90° of its circumference (see FIG. 3) cut from its upper surface, through which slot the fluid from the raceway surface exits from the tank 13 when pipe 33 is rotated so the slot is at least partially below the fluid surface level. Operating means for rotating the pipe 33 in the desired direction are provided in the form of a depending lever arm 41 which is affixed, as by welding, to the bottom of the pipe 33. The slotted pipe 33 is biased to the position shown in FIGURE 3, with the open slot 39 above the surface of the fluid in the raceway, by a counterweight 43 attached to the lower end of the lever arm 41. An end plug 45, which is attached, as by welding, to the right-hand end of the pipe 33, as viewed in FIGURE 2, closes the end of the pipe and prevents entry of fluid therethrough. Any suitable means may be employed to secure the pipe 33 longitudinally within the socket 37 so long as the rotation of the pipe 33 about its horizontal axis is not interfered with. A mounting plate 47, which is attached to the inner end of the socket 37 lies generally flush against the inner wall of the tank 13 and carries a stop 49 having a portion residing in the open slot of the pipe 33 which limits the angular amount which the pipe 33 can be rotated, as will be hereinafter explained in detail.

The scum-skimmer 31 is supported on the outer ends of the raking arms 15 and accordingly circumvents the peripheral raceway 23 as the raking arm 15 sweeps around the tank bottom. The scum-skimmer 31 includes an upper plate or paddle 51 of generally triangular shape, which is supported at about the surface level of the fluid in the raceway 23. As the scum-skimmer 31 travels circumferentially about the tank 13 in the raceway 23, the plate 51 moves the floating scum ahead of it within the raceway, causing the scum either to aggregate and thus sink or to move forward of it to the fluid discharge means 32 wherefrom it is withdrawn from the tank. The plate 51 is mounted at the upper end of a long pivotal arm 53 which has a pivot point 55 near the lower end thereof. The arm 53 is pivoted at the upper end of an upstanding bracket or standard 57 affixed to and carried by the outermost end of the raking arm 15. A counterweight 59 at the bottom end of the pivot arm 53 normally maintains the arm in a vertical position as illustrated in FIGURE 4. The plate 51 has a width slightly less than that of the raceway 23, or if a spiral raceway is employed, slightly less than the width of the narrowest point of the spiral raceway.

Now referring specifically to drawings 4 through 8 wherein the cooperative action of the scum-skimmer 31 and the fluid discharge means 32 are diagrammatically described, the first figure (FIG. 4) shows the normal orientation of the scum-skimmer 31 as the raking arm 15 upon which it is supported slowly approaches the pipe 33. In this position, the plate 51 extends above the fluid level in the raceway 23 and accordingly moves the floating scum on the surface of the fluid in the raceway ahead of it toward the pipe 33. When the plate 51 contacts the pipe 33 (FIGS. 3 and 5) and the raking arm 15 continues to rotate, the arm 53 is pivoted counterclockwise as shown in FIGURES 5–8.

As the raking arm 15 continues to rotate, the plate 51 engages the depending lever arm 41, as shown in FIGURE 6, and begins to turn the pipe 33 about its horizontal axis. In the sequence position illustrated in FIGURE 7, the pipe 33 has been rotated to the full extent of the angular travel permitted by the stop 49, so that the bottom edge of the open slot is well below the surface of the fluid level in the raceway 23. In this position, there is discharge of fluid through the pipe 33 into the scum box 35. The floating scum which has been moved by the plate 51 on the scum-skimmer 31 to the vicinity of the pipe 33 accompanies this flow or rush of fluid into the pipe through the open slot 37.

The open slot 37 stays below the fluid level until the raking arm 15 revolves sufficiently far so that the plate 51 loses contact with the lever arm 41. FIGURE 8 shows the position of the lever arm 41 and the pivot arm 53 slightly before contact is lost. As can be seen, there is discharge of fluid and floating scum through the pipe until contact is lost. At this time, the counterweight 43 at the lower end of the lever arm 41 causes the pipe 33 to turn until it returns to the position shown in FIGURE 4, thereby halting further fluid discharge because the open slot 37 is completely above the level of fluid in the raceway 23.

Assuming that the raking arms 15 revolve at a substantially constant speed, the time interval for which the open slot 37 permits fluid flow through the pipe 33 can be easily regulated by various mechanical expedients. For example, the depending lever arm may simply be shortened so that contact between it and the skimmer 31 terminate sooner and the time interval for fluid discharge is thus shortened. Obviously, lengthening the lever arm would have the opposite effect. Alternatively, the standard 45 may be lengthened so that the pivot point 55 is at a different location.

Operation of the scum-skimming device 31 and rotatable pipe 33 arrangement illustrates that floating scum in a clarifier 11 of the peripheral influent feed type can be effectively controlled with only intermittent discharge of fluid into the scum box 35. In a clarifier 11 having a cylindrical tank 13 of approximately 60 feet internal diameter, and having two revolving raking arms 15 each of which carries a scum-skimmer 31 supported at the outer end thereof, it is considered normal operation to drive the raking arms so that each arm turns a full 360° revolution in about 32 minutes. Under these circumstances, it has been found that effective control of the floating scum can be maintained by discharging fluid through the pipe 33 for two time intervals of about one-half minute apiece (a total of one minute for each 32 minutes of clarifier operation, i.e., the time it takes one raking arm 15 to complete an entire revolution). Accordingly, it can be seen that there is a significant advantage gained from the reduction in total volume of fluid discharged to the scum box 35 by establishing intermittent discharge in the above manner so that discharge to the scum box 35 occurs only about 3 percent of the time and can be easily varied to accommodate specific conditions.

Various of the features of the invention are set forth in the following claims.

What is claimed is:

1. In a clarifier having a peripheral feed inlet in a cylindrical tank of circular cross-section, a tubular baffle supported therewithin to provide a peripheral raceway, outlet means for removing effluent from said tank and thereby establishing a predetermined fluid level within said tank and within said raceway, a revolvable sludge removal assembly mounted within said tank for sweeping the bottom of said tank, discharge means in said tank at the approximate vertical height of said predetermined fluid level through which discharge means fluid may be discharged to a location exterior of said tank, and scum-skimming means disposed in said tank supported upon said sludge removal assembly for revolution therewith, which scum-skimming means includes a plate member supported on a pivot arm which is biased so that said plate member pivots under said discharge means when said revolvable sludge removal assembly passes therebeneath, which plate member normally travels partially submerged and partially above said predetermined fluid level and is proportioned to cause floating scum to be carried in the direction in which it revolves, the improvement which comprises said discharge means being normally closed and including a pipe rotatably mounted in the outer wall of said tank which pipe has an open slot therein, and biasing means depending from said rotatable pipe which causes said open slot to normally face generally vertically upward where said slot resides completely above said predetermined fluid level, said slot and said plate member being within said peripheral raceway, said biasing means including a depending lever arm attached to said rotatable pipe and which is engaged by said plate member when said revolving scum-skimming means reaches said discharge means and causes said pipe to rotate and move said open slot at least partially below said predetermined fluid level whereby floating scum carried by said scum-skimming means discharges through said discharge pipe until revolution of said scum-skimming means causes contact between said lever arm and said plate to be lost.

2. Waste treatment apparatus comprising a cylindrical tank of circular cross-section, a tubular baffle supported therewithin to provide a peripheral raceway, inlet and outlet means for supplying the sludge-containing fluid to said tank and maintaining a predetermined fluid level therein, said inlet means emptying into said peripheral raceway, a sludge removal assembly rotatably mounted within said tank for sweeping the bottom of said tank, scum-skimming means carried by said rotative sludge removal assembly and revolving therewith, said scum-skimming means including a plate member which extends above the predetermined level of fluid, normally closed discharge means including a discharge pipe rotatably mounted in the outer wall of said tank at the approximate vertical height of said predetermined fluid level, which pipe has an opening therein through which fluid may be discharged to a location exterior of said tank, a lever arm attached to said pipe at a position generally diametrically opposite said opening, and a counterweight attached to said lever arm biasing said rotatable pipe to a position wherein said opening faces generally vertically upward and resides completely above said predetermined fluid level, said plate member being supported on a pivot arm which is biased so that said plate member normally travels partially submerged and partially above said predetermined fluid level but pivots under said rotatable pipe while simultaneously engaging said lever arm and causing said pipe to rotate so that said opening is at least partially below said predetermined fluid level whereby floating scum and fluid discharges through said discharge pipe until revolution of said scum-skimming means causes contact between said lever arm and said plate to be lost.

References Cited
UNITED STATES PATENTS

| | | | |
|---|---|---|---|
| 1,990,458 | 2/1935 | Marshall | 210—525 X |
| 2,220,959 | 11/1940 | Jennings | 210—525 X |
| 2,611,489 | 9/1952 | Scott | 210—528 |
| 2,681,151 | 6/1954 | Coulter | 210—528 |
| 2,798,041 | 7/1957 | Thompson et al. | 210—512 |

REUBEN FRIEDMAN, *Primary Examiner.*

J. DE CESARE, *Assistant Examiner.*